No. 792,856. PATENTED JUNE 20, 1905.
W. H. H. STEVENSON.
CAN MAKING MACHINE.
APPLICATION FILED FEB. 20, 1904.
5 SHEETS—SHEET 1.
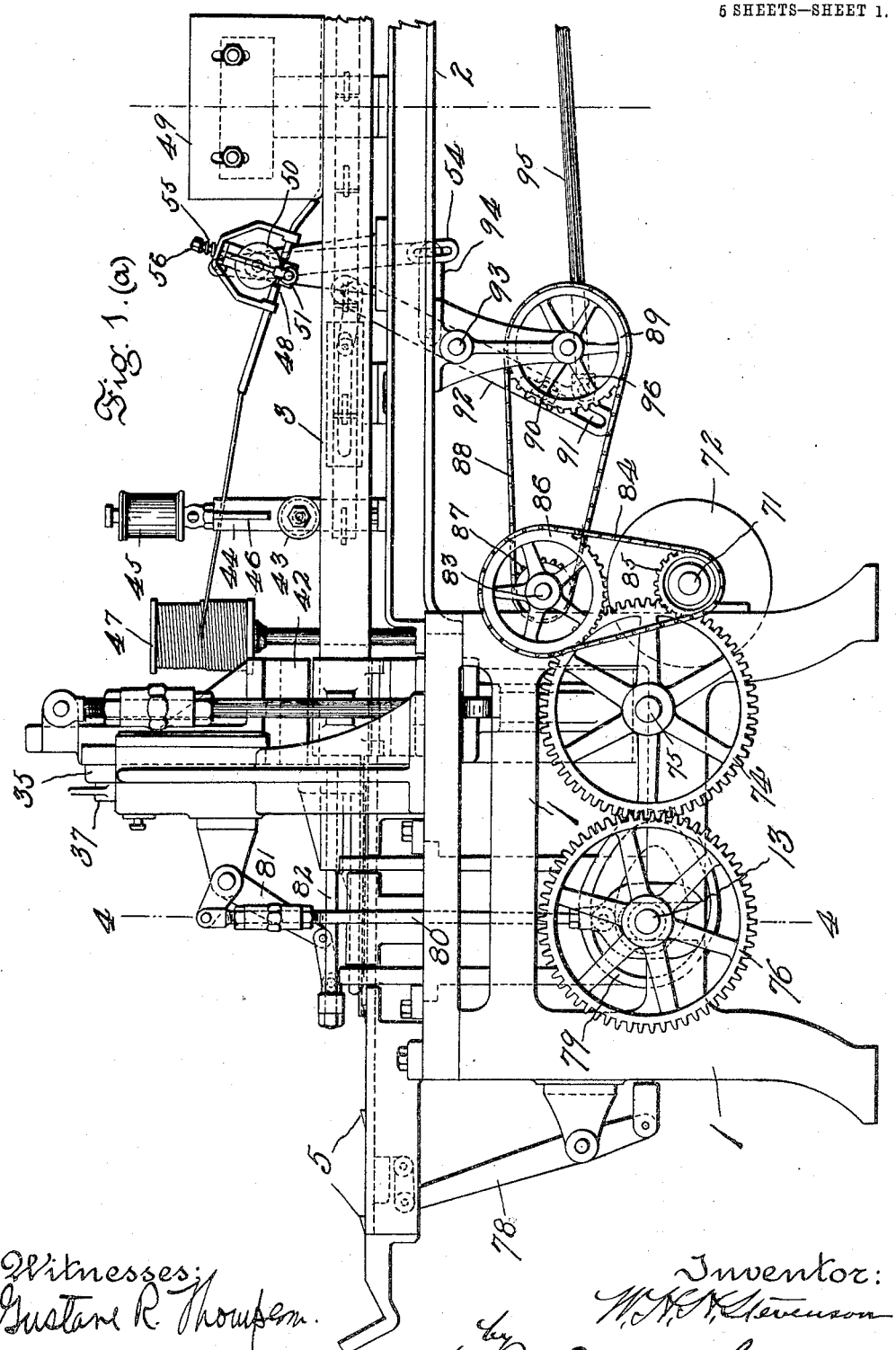

No. 792,856. PATENTED JUNE 20, 1905.
W. H. H. STEVENSON.
CAN MAKING MACHINE.
APPLICATION FILED FEB. 20, 1904.
5 SHEETS—SHEET 2.
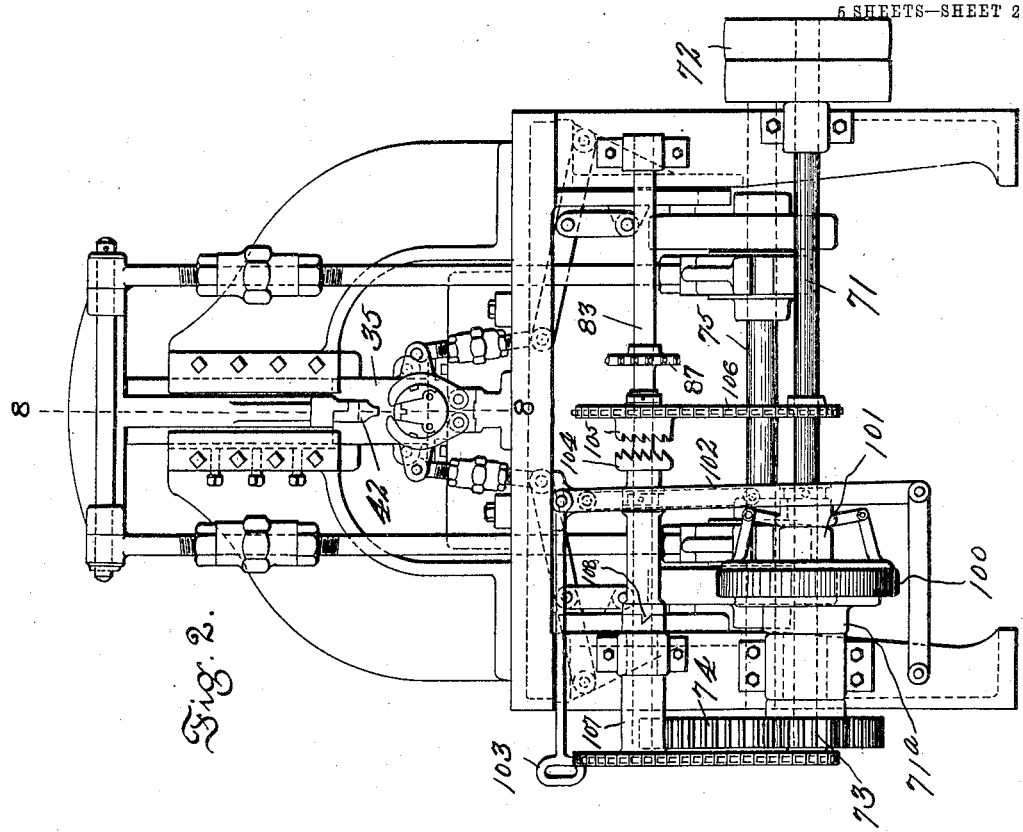
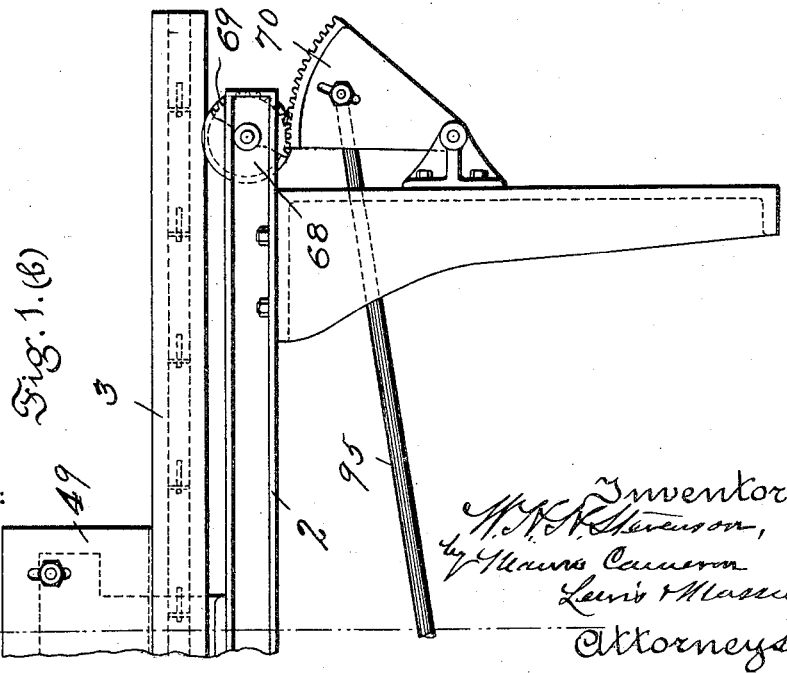

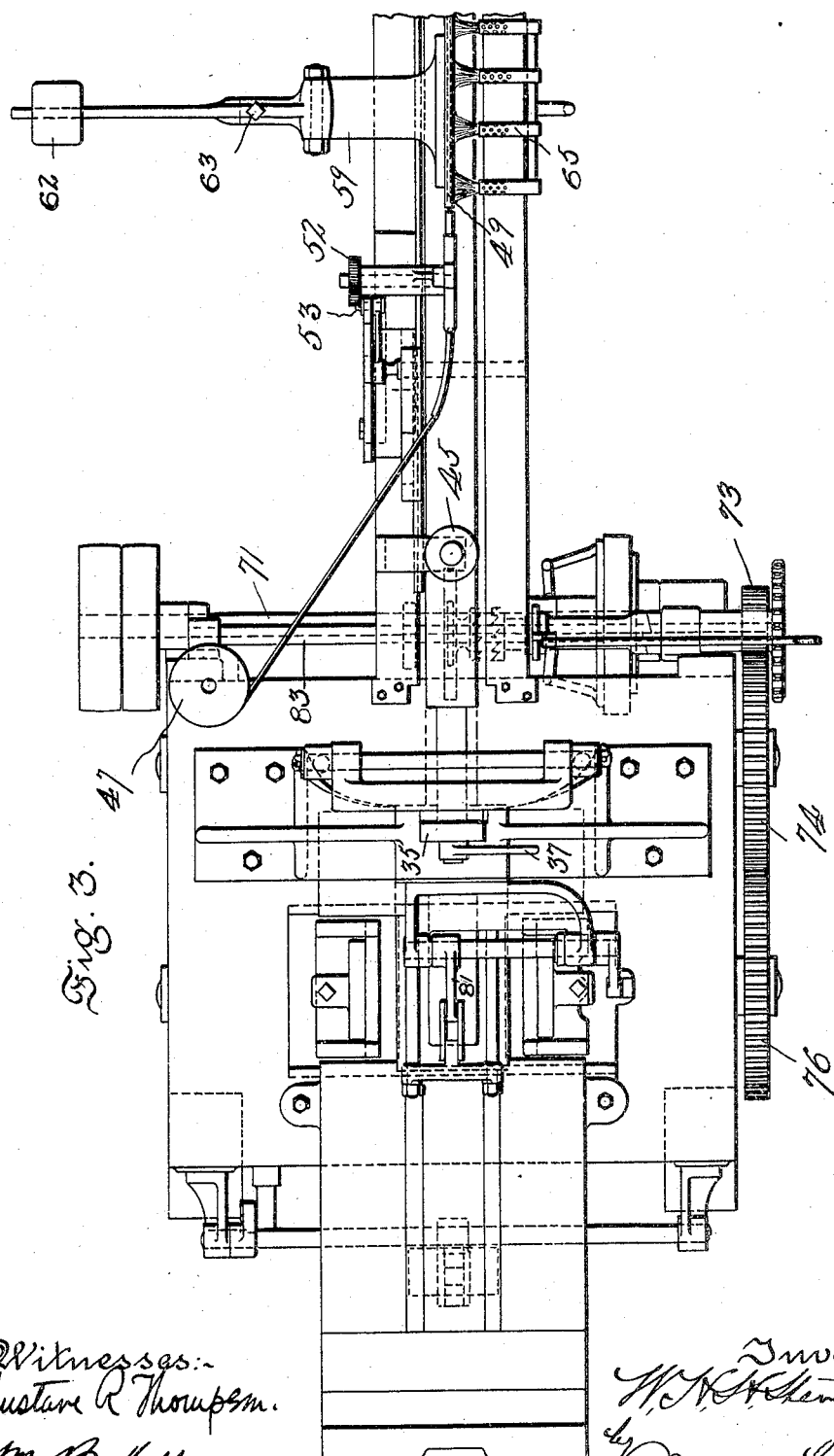

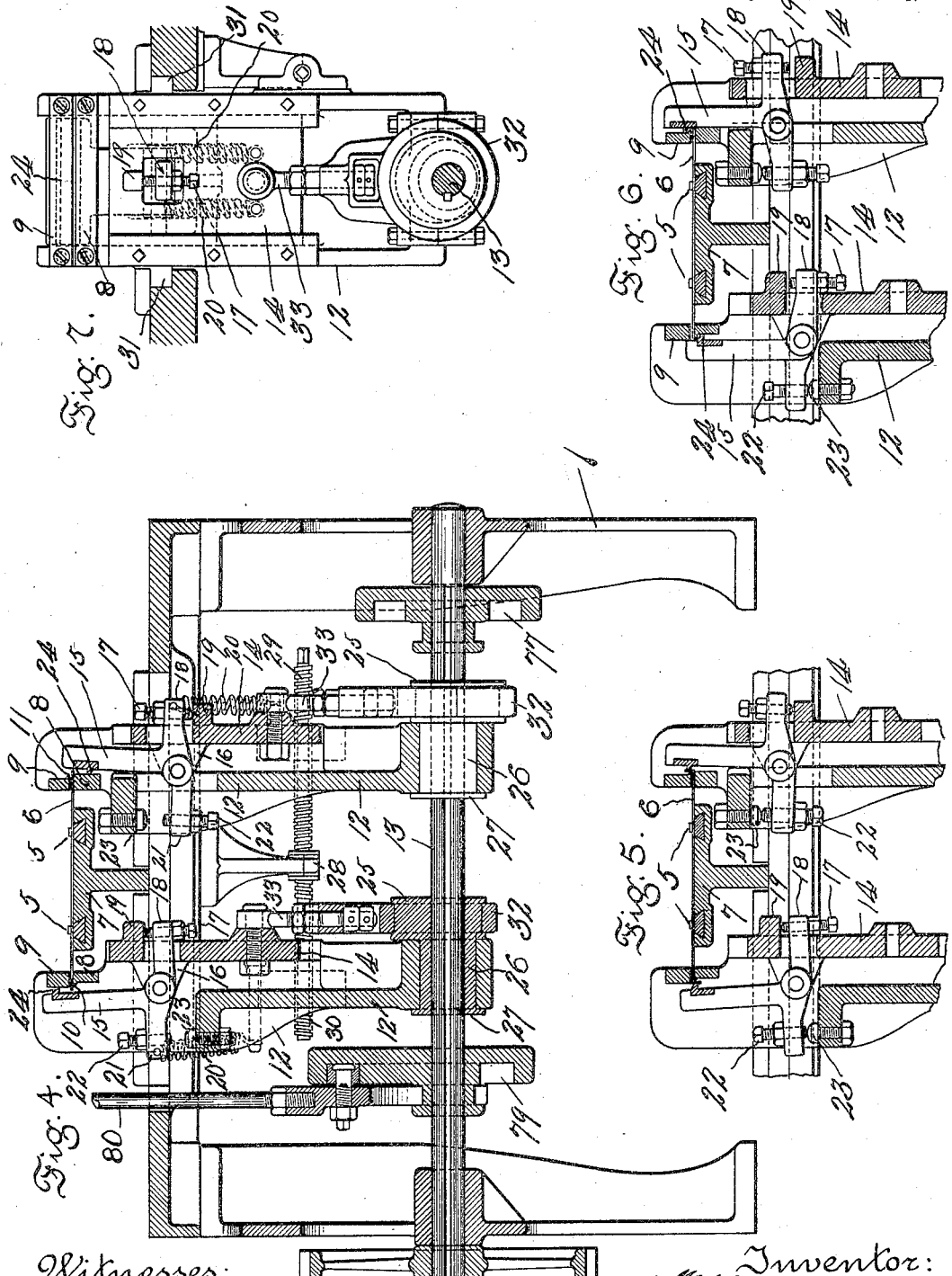

No. 792,856. PATENTED JUNE 20, 1905.
W. H. H. STEVENSON.
CAN MAKING MACHINE.
APPLICATION FILED FEB. 20, 1904.
5 SHEETS—SHEET 5.
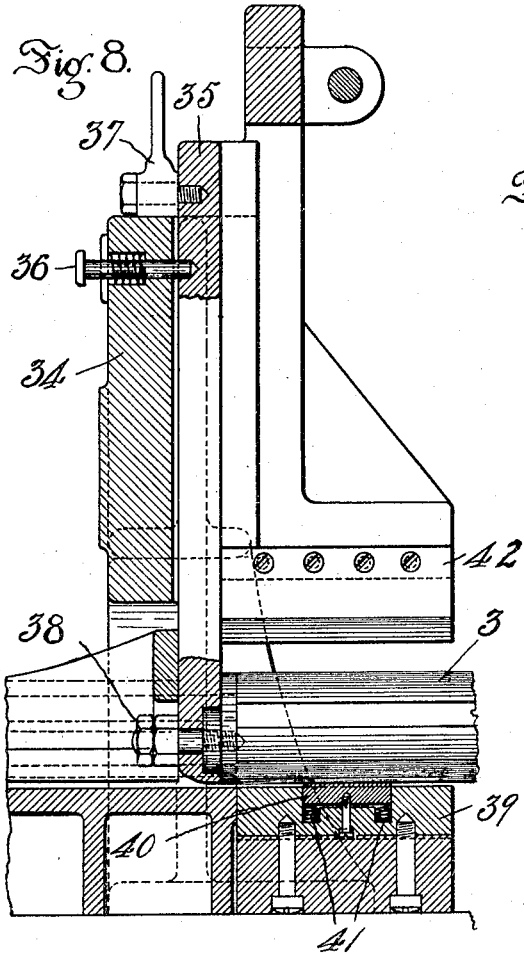
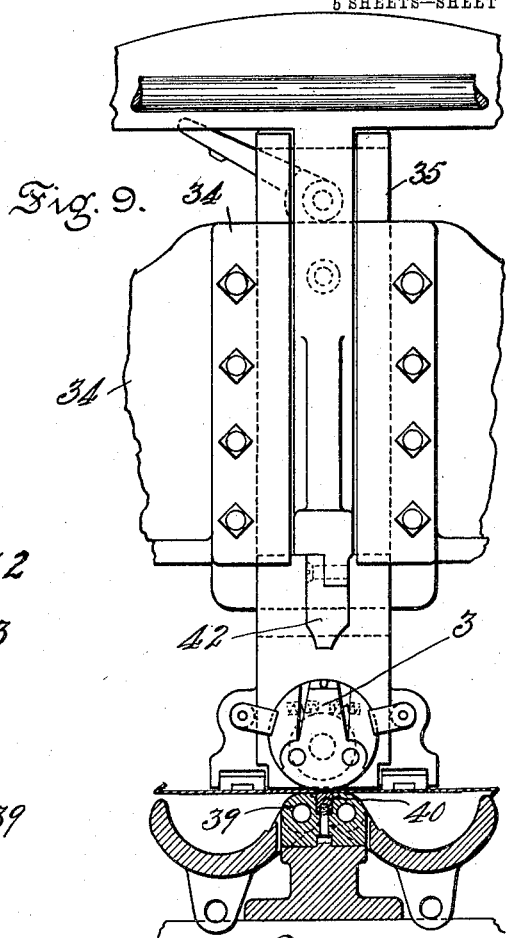
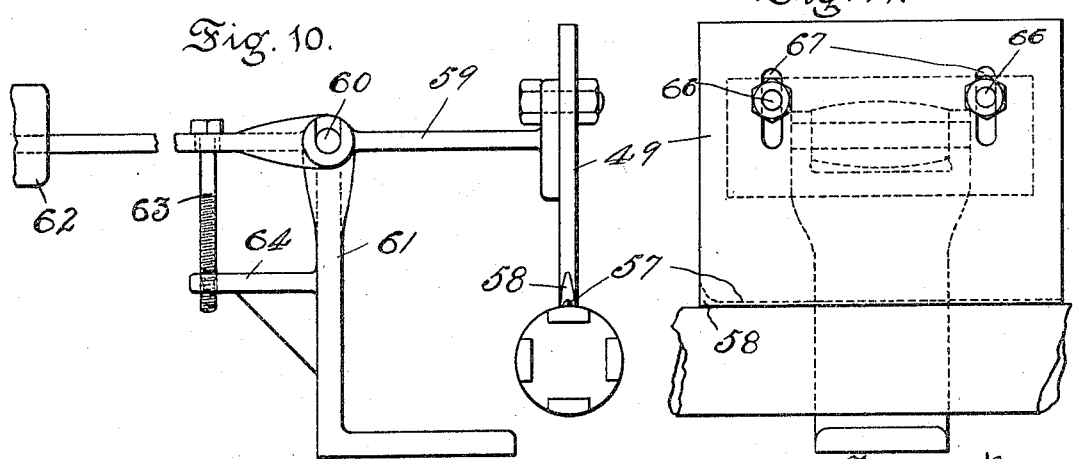

No. 792,856. Patented June 20, 1905.

UNITED STATES PATENT OFFICE.

WILLIAM H. H. STEVENSON, OF BALTIMORE, MARYLAND.

CAN-MAKING MACHINE.

SPECIFICATION forming part of Letters Patent No. 792,856, dated June 20, 1905.

Application filed February 20, 1904. Serial No. 194,598.

*To all whom it may concern:*

Be it known that I, WILLIAM H. H. STEVENSON, a resident of Baltimore, Maryland, have invented a new and useful Improvement in Can-Making Machines, which invention is fully set forth in the following specification.

My invention relates to can-making machines, and more particularly to those machines designed to form the body of the can preparatory to putting on the heads or end closures. In my Patent No. 686,866 I have shown and described a machine of this character in which the edges of the tin blank are upset and are then overlapped until the opposite edges engage each other, when they are firmly pressed together, after which a proper flux is applied as the can-body moves along an extended horn or mandrel, and the seam is then automatically soldered, after which the body is ejected from the horn.

My present invention is an improved machine of the same general principle as that described in my said patent.

The inventive idea involved is capable of receiving various mechanical expressions, one of which is illustrated in the accompanying drawings, in which—

Figures 1$^a$ and 1$^b$ together constitute a side elevation of the machine. Fig. 2 is a rear elevation of the main part of the machine with the prolonged horn or mandrel and the accompanying fluxing and soldering devices removed. Fig. 3 is a plan view of the machine with the exception of the ejecting mechanism, and Fig. 4 is a transverse section on the line 4 4, Fig. 1. Figs. 5 and 6 are transverse sectional detail views of the upsetting-slides, showing the operation of the same; and Fig. 7 is a side elevation of one of said slides in position. Fig. 8 is a broken section on the line 8 8 of Fig. 2, the mandrel being shown in side elevation. Fig. 9 is a rear elevational view of Fig. 8. Fig. 10 is a front elevation of the soldering-iron and its counterbalancing device, and Fig. 11 is a side elevation of said iron.

Referring to the drawings, 1 is the framework of the machine, upon which the driving mechanism is mounted and which is provided with a rail or part 2, extending to the rear and supporting the prolonged horn 3. Mounted upon the frame 1 is a reciprocating feed-slide of any suitable construction and provided with the usual feed-lugs 5, Fig. 1$^a$, for engaging the blanks and advancing them one at a time to the machine, the blanks being fed to the feed-slide by hand.

The first part of my improvements relates to the upsetting or edging devices, which are best illustrated in Figs. 4 to 7, inclusive. As shown in these figures, the fingers 5 on the feeding-slide advance the blank 6 along a bed 7 with its edges projecting slightly outside of two rails 8 8, over which hang two additional rails 9 9, with just sufficient space between the rails 8 and 9 to allow the blank to be readily fed between them. One of the lower rails 8 is provided with an anvil-toe 10, underlying the projecting edge of the blank, and the overhanging rail on the opposite side is provided with the anvil or toe 11, overlying the projecting edge of the blank. These rails 8 and 9 are mounted in a framework 12, arranged to be adjusted toward and from the bed 7, suitable slideways being formed in the upper portion of the framework of the machine for this purpose, while the lower parts of the frame 12 are guided by one of the power-shafts 13. Each half of the framework 12 has mounted thereon a vertically-reciprocating slide 14, (see Fig. 7,) moving in suitable ways on the frame 12, each of these slides carrying a transversely-oscillating die-lever 15, pivoted in lugs 16, projecting from the face of the slide. These levers 15 project upward into proximity to the projecting edge of the blank, and the movements of the slides cause said levers to reciprocate past the projecting edges of the blank and the anvils 10 and 11 above referred to. Each of the die-levers 15 is preferably in the form of a bell-crank lever, the lower arm of which is provided with means for normally adjusting the position of the lever relative to the anvils. As here shown, these means consist of screws 17, passing through the arms 18 of bell-crank levers 15 and abutting lugs 19 on the slides 14. Springs 20 engage the die-levers 15 and the framework 12 and react in such a way as to normally draw the adjusting-screws 17 into contact with the lugs 19 on the slides, and by adjusting these screws 17 the position of the levers 15 relative to the anvils 10 and 11 may be readily secured. On the opposite side of the fulcrums of the levers 15 are projecting arms 21, preferably provided with adjusting-screws 22, which during the reciprocations of the slide 14 are arranged to strike abutments 23 upon the frames 12, thereby causing the levers 15 to rock upon their fulcrums and throwing the upper ends of the levers inward toward the bed 7. The upper ends of said levers are provided with horizontal longitudinally-extending lips 24, preferably composed of hardened steel inserted into said levers, and the adjustment of the levers is such as to cause these lips 24 to move past the anvils 10 and 11 with just sufficient clearance to compensate for the thickness of the metal of the blank to be operated upon. The slides 14 are simultaneously reciprocated in opposite directions, causing the ridges 24 to act, the one to bend the projecting edge of the blank up, while the other bends the projecting edge of the blank down over the anvils 11 and 10, respectively, and just as the ridges or lips 24 have passed the one above and the other below the anvil (which position is shown in Fig. 5) the set-screws 22 upon the respective levers impinge upon the abutments 23, as clearly shown in Fig. 5, whereupon the further movement of the slides 14 causes the levers to move inward, as is clearly shown in Fig. 6. By this action the projecting edges of the blank are first bent at right angles to its surface and in reverse directions and are then bent inward to form the upset interlocking edges of a character well known in this art. Upon the reverse movement of the slide the springs 20 act to withdraw the levers 15 far enough outward to permit them to escape the anvils 10 and 11, and the feed-slide, with its engaging catches 5, advance the blank with its edges upset to the anvil and its associated mechanism for bending the blank into circular form. The reciprocations of the slides 14 are secured by means of eccentrics 25, keyed to the shaft 13 so as to turn therewith, but being free to slide thereon. These eccentrics are provided with lateral bushings 26, secured thereto and preferably integral therewith, and the lower portions of the framework 12 are sleeved upon said bushings 26, as is clearly shown in Fig. 4, so that the bushings are free to turn with the shaft and within the lower portions of the frame 12, flanges 27 securing the sleeve portions of the frame 12 in place upon the bushings.

Secured to and depending from a portion of the framework of the machine is a support 28, affording bearings to right and left hand screws 29 and 30, which engage correspondingly-threaded portions of the frame 12. By the manipulation of the screws 29 and 30 the respective oppositely-disposed parts 12 of the frame may be adjusted toward and from the bed 7, so as to bring the anvils 10 and 11 in the desired positions with regard to the blank 6, thereby enabling the machine to be set to operate upon different-sized blanks. During these adjusting operations the upper portions of the frame 12 slide in grooves upon the upper part of the frame of the machine, as indicated at 31 in Fig. 7, and the lower portions of the frame 12 slide along the shaft 13, carrying the eccentrics 25 with them. These eccentrics are connected to the slides 14 by bands 32, surrounding the eccentrics, which bands are connected by suitable links 33 to the slides.

The edges of the blank having been upset, it is then advanced to the horn or anvil, where it is formed into cylindrical form, so as to interlock the opposite edges, and this interlocking seam compressed by a suitable plunger brought down upon the anvil. The means for folding the blank around the horn and the reciprocating plunger for compressing the seam may be of any suitable construction—for example, such as that shown in my patent aforesaid. In the present machine, however, there are provided certain improvements in the mounting of the horn and in the means for supporting the horn at the instant when the plunger has descended for closing the seam. In the operation of machines of this kind as heretofore devised it sometimes occurs that blanks become twisted or deformed as they are in the act of being advanced under the end of the horn, and in order to remove the mutilated blank it has been necessary to take the machine apart to a certain extent, thereby involving the loss of much time. In order to obviate this objection, I have mounted the end of the horn upon an adjustable support, whereby the same may be elevated in case of accident to a sufficient extent to permit the mutilated blank to be removed from the machine and the horn promptly returned to its position. Moreover, I have provided means whereby when the plunger descends with much force for the purpose of setting the seam the end of the horn will be supported upon a rigid anvil, the slight yield of the horn being sufficient to firmly seat it upon the anvil for this purpose.

The construction referred to will be best understood from an inspection of Figs. 8 and 9, wherein 34 is a part of the supporting-framework of the machine and 35 is a vertically-reciprocating slide mounted upon said framework and having a stop-pin 36 to engage and support it in its operative position. Secured to said slide 35 is a cam 37, having bearing upon the top of the framework 34, the cam, as shown in Figs. 8 and 9, being in a position to permit the slide to occupy its lowermost or operative position, and the shape of the cam being such that when the handle of the cam is depressed (the pin 36 having first been withdrawn) the cam will operate to elevate the slide 35 somewhat above its normal operative position. On the lower end of the slide 35 the horn 3 is firmly secured, as by bolt 38, in such a position as to afford a clearance about equal to the thickness of the sheet metal under treatment between the horn and the solid anvil 39, suitably mounted upon the framework of the machine under the end of the horn. Within the anvil 39 there may be, and preferably is, a block 40, normally pressed upward by springs 41, the front or left-hand end of the block being slightly beveled to permit the blank to be readily advanced between the spring-pressed block and the horn by the feeding mechanism. The plunger 42 is mounted to reciprocate vertically in a slideway supported by the frame 34, (see Figs. 8 and 9,) which slideway may be, if desired, formed in connection with the slideway which controls the slide 35, though this is not essential. In the operation of this part of the mechanism the parts normally occupy the position shown in Figs. 8 and 9, with the slide 35 in its lowermost position supported by the pin 36, and when the blank is advanced between the horn 3 and the anvil 39 the blank very nearly fills the clearance-space between the horn and anvil, and when the plunger descends with considerable force to set the seam in the can-body the end of the horn is supported solidly upon the anvil, so as to prevent the vibration and play of the horn, which in previous machines has served in time to slightly deflect the horn from its normal position.

The blank having been bent up and the seam closed, so as to form the can-body, the latter is advanced by the feed mechanism along the horn and from under the plunger 42. The mechanism for thus advancing the body may be any suitable form of feed mechanism and is preferably of a reciprocating slide form, as shown in my previous patent, and as such feed mechanism forms no part of the present invention it is not necessary to more fully describe it herein, mechanism of this kind being well known in the art.

As the can-body is advanced along the horn with the compressed seam uppermost it is passed under a roller 43, Fig. 1ª, which roller is composed of or provided on its outer periphery with any suitable absorbent material, as felt, and is mounted upon a standard 44 at one side of the horn, upon which standard is supported a reservoir 45, containing acid or any suitable fluxing material, which is permitted to slowly drip upon the roller 43 through a spout or tube 46, as will be clearly understood from an inspection of Fig. 1ª. The roller 43 is so positioned that as the can-body is advanced along the horn the seam thereon is wiped under the roller and the acid or other flux is applied thereto. The acid having been applied, the continued feed of the body along the horn brings it to the soldering mechanism. This soldering mechanism is designed to employ wire-solder mounted on any suitable spool 47, from which the wire passes through feed mechanism 48 to the soldering-iron 49. The solder-feed consists of a pair of grooved rollers 50 51, Fig. 1ª, between which the wire-solder passes, the roller 50 having a ratchet-wheel 52, Fig. 3, rigid therewith, which ratchet-wheel is engaged by a pawl 53, secured to an oscillating lever 54, which is operated in a manner to be hereinafter described. For the purpose of adjusting the roller 51 relative to the roller 50 said roller 51 is mounted in a movable framework, which permits it to be adjusted toward or from the roller 50, and is yieldingly held in position by a spring 55, whose tension is adjusted by a nut 56.

The soldering-iron is in the form of a bar or metallic plate 49, having a groove 57 along its lower edge adjacent to the horn, which groove is slightly beveled upward, as at 58, Figs. 10 and 11. For the purpose of adjusting the soldering-iron with relation to the horn it is secured to a rocking arm 59, mounted to turn about an axis 60 in a bracket 61, carried by the frame of the machine, the weight of the lever and soldering-iron being counterbalanced by a weight 62 on the opposite end of the arm 59. Preferably the weight 62 is such that it is slightly overbalanced by the weight of the soldering-iron, and to prevent the soldering-iron from descending into contact with the horn a screw 63 passes through a slot (shown in dotted lines) in the arm 59 and has its screw-threaded end in engagement with a corresponding thread formed in the bracket 64, the object of this construction being to permit the iron to rise sufficiently to permit the seam to pass thereunder, while the seam shall remain in contact therewith, and at the same time adjust the iron so that it will at all times contact with the seams that pass thereunder, while being prevented from contacting with the horn whenever a can-body is not in position under the soldering-iron. The iron may be heated in any suitable way—as, for example, by a series of gas-jets 65. (Shown in Fig. 3.) Further means of vertically adjusting the soldering-iron 49 is provided by bolting it to the arm 59 by bolts 66, Figs. 1ª and 11, passing through slots 67 in the iron and engaging the arm 59.

As the can-body is advanced from under the soldering-iron by the feed mechanism it is brought upon a portion of the horn 3, along which it is permitted to travel for a sufficient length of time to insure the setting of the solder, after which it is ejected from the end of the horn, (illustrated in Fig. 1ᵇ,) where the outer end of the horn is shown as supported on a cylinder 68, mounted to rock on a horizontal axis transverse to the horn, the rocking action being imparted to the cylinder by means of a toothed segment 69, secured thereon and engaged by a corresponding toothed segment 70, to which a reciprocating movement is imparted by the driving mechanism of the machine in a manner which will be hereinafter described. The rocking actions of the cylinder 68 are so timed that it moves in one direction, so as to engage the can-body as it is advanced by the feed to eject it off of the horn, the reverse action taking place along the interval between the can-bodies.

Referring now to the means for operating the various parts of the machine, 71 is a main drive-shaft receiving its power from drive-pulley 72, and this shaft has a sleeve 71ª, which surrounds it and has bearing in the frame, and rigid with this sleeve is a gear-wheel 73, engaging a gear-wheel 74, keyed to a shaft 75, having bearing in the frame, the gear-wheel 74 in turn gearing with a gear 76, keyed upon the shaft 13, hereinbefore mentioned. The shaft 13 is provided with the eccentrics 25, hereinbefore mentioned, for operating the slides which control the edging devices and also with an eccentric 77, which by suitable links reciprocate the levers 78, Fig. 1ª, for operating the feed-slide bearing the catches 5, which advance the blank to the edging devices and from thence to the anvil. There is also keyed to the shaft 13 an eccentric 79, which through the connecting-link 80, Figs. 1ª and 4, operates the bell-crank lever 81, by means of which the reciprocating feed-slide 82, of usual or any suitable construction, is operated for the purpose of advancing the can-body from under the plunger 42 along the horn 3. As the specific form of the two feed mechanisms mentioned form no part of my present invention and as such feed mechanisms are well known in the art, a further detailed description thereof will be unnecessary.

The reciprocations of the plunger 42 are controlled from the shaft 75 by any suitable cam or eccentric devices, which may, for example, be such as that shown in my patent before referred to, the detailed illustration of which is deemed unnecessary in the present application.

Mounted in suitable bearings upon the framework of the machine, above the shaft 71, is a shaft 83, which shaft is driven from the shaft 71 by a sprocket-chain 84 engaging a sprocket-wheel 85 on the shaft 71 and a like sprocket-wheel 86 on the shaft 83. (See Fig. 1ª.) This shaft 83 has also mounted thereon a sprocket-wheel 87, around which extends a sprocket-chain 88 to a sprocket-wheel 89, carried in the bracket depending from the extended portion 2 of the frame of the machine, and this sprocket-wheel 89 has a crank-pin 90 engaging a slot 91 in the lever 92, pivoted at 93, which lever is operatively connected to the feed-slides for advancing the can-bodies along the horn. Moreover, the lever 92 is also connected by a link 94 to the oscillating lever 54, which actuates the pawl-and-ratchet mechanism for feeding the wire-solder to the soldering-iron.

In addition to the lever 92, which is connected by a crank-pin to the sprocket-wheel 89, there is also a link 95 connected to said sprocket-wheel by a crank-pin 96, and this link 95 extends rearward and is connected to the oscillating toothed segment 70 for operating the rocking cylinder 68, supporting the end of the horn.

In the operation of the machine it is essential that no can-bodies should be left to entirely cool upon the horn, as otherwise bits of solder clinging thereto would be liable to solder the can-body to the horn.

For the purpose of operating the ejecting mechanism and the rocking cylinder and at the same time stopping the operations of the body-forming parts of the machine certain clutch mechanism has been introduced, which will now be described.

Referring to Fig. 2, 100 is a clutch member secured to the sleeve 71ª, and 101 is a clutch member keyed to the shaft 71, which clutch member is actuated to slide upon the shaft 71 by a lever 102, controlled by the handle-bar 103. The lever 102 is also secured to the clutch member 104, keyed on the shaft 83, but free to slide toward and from a clutch member 105, loose on the shaft 83, but rigid with a sprocket-wheel around which passes a sprocket-chain 106, which also engages a sprocket-wheel keyed on the shaft 71. It will be seen that when the clutch members 100 and 101 are disengaged the revolutions of the shaft 71 will not operate to impart movements to any of the parts of the machine unless the clutch members 104 and 105 are thrown into engagement. If the last-named clutch members are engaged, however, the shaft 83 will be revolved, and thereby actuate the sprocket-chain 88 and through it the sprocket-wheel 89, thereby actuating the ejecting mechanism and the cylinder 68 at the rear end of the machine. In order that the operations of the shaft 83 when thus driven may not impart movement to the sprocket-wheel 86 and the sprocket-chain 84, the wheel 86 is mounted upon a sleeve 107, Fig. 2, which sleeve is free to turn upon the shaft 183 and which is fixed to the shaft 83 by any suitable clutch mechanism 108, which clutch is opened by the action of the hand-lever in throwing the clutch members 104 and 105 into engagement, but is closed by the act of throwing the clutch members 100 and 101 into engagement. With this construction of clutch mechanism when it is desired to start the machine, the workman seizes the handle-bar 103 and pulls it outward, thereby throwing clutch members 100 and 101 into engagement and engaging clutch 108 with sleeve 107, whereby the revolutions of the shaft 71 serve to operate the gear-wheel 74 and, through the sprocket-chain 84, sleeve 107, and clutch 108, also operates the shaft 83, which in turn drives the sprocket-wheel 89, which controls the feed along the prolonged horn, the solder-feed, and the rocking cylinder at the end of the horn. When it is desired to stop the body-forming part of the mechanism, but to continue to eject the can-bodies already completed from the horn, the operator grasps the handle-bar 103 and forces it inward until clutch member 104 engages clutch member 105, thereby opening clutches 100 and 101 and the clutch 108, so that the further revolution of the shaft 71 serves to drive the shaft 83 and through it the body-advancing feed and the rocking cylinder without operating the can-body-forming devices.

From the foregoing it will be perceived that I have succeeded in much simplifying the edging devices for upsetting the edges of the blank and have provided ready means for adjusting the same to blanks of different sizes, have provided for the vertical adjustment at the end of the horn, whereby mutilated blanks may be readily removed, and also have provided a rigid and firm anvil-support for the horn at the time the same is being compressed, and have supplied an efficient soldering device of simple construction and an effective means for ejecting the can-bodies from the horn. Moreover, I have provided means whereby the final advancement of the formed can-bodies along the horn and the ejectment thereof from the end of the horn may be accomplished while the can-body-forming portion of the machine is out of operation.

What is claimed is—

1. In a can-making machine, the combination of a pair of anvils, and means retaining the blank in a plane against said anvils, with a pair of oppositely-disposed reciprocatory and oscillatory die-levers mounted on reciprocating fulcrums, means simultaneously reciprocating said levers in opposite directions, and abutments engaged by said levers during the terminal part of said reciprocatory movement to oscillate the same.

2. In a can-making machine, the combination of a pair of anvils and means retaining the blank in a plane against said anvils, with a pair of oppositely-disposed reciprocating slides, die-levers pivotally mounted on said slides so as to oscillate toward and from each other, and yielding means normally holding said levers in operative relation to said anvils, and stationary abutments engaged by the levers on the reciprocation of the slides, whereby the levers are oscillated.

3. In a can-making machine, the combination of a pair of anvils, a pair of oscillatory die-levers mounted on reciprocating fulcrums to reciprocate in opposite directions past said anvils, and stationary abutments engaged by said die-levers on the terminal part of their longitudinal movement, whereby they are oscillated in reverse directions past said anvils.

4. In a can-making machine, the combination of a pair of anvils, laterally-adjustable supports for said anvils, a pair of oscillatory die-levers mounted in said supports to reciprocate in opposite directions past said anvils, and stationary abutments on said supports and engaged by said die-levers on the terminal part of their longitudinal movement, whereby they are oscillated in reverse directions past said anvils.

5. In a can-making machine, the combination of a pair of anvils, laterally-adjustable supports for said anvils, a pair of vertically-reciprocating slides on said supports, die-levers fulcrumed on said slides, and abutments on said supports in the path of movement of said levers, whereby the reciprocation of said slides imparts both reciprocatory and oscillatory movements to said die-levers.

6. In a can-making machine, the combination of a pair of anvils, laterally-adjustable supports therefor, a pair of vertically-reciprocating slides on said supports, means reciprocating said slides and adjustable with the supports, die-levers fulcrumed on said slides, and stationary abutments on said supports in the path of movement of a part of said levers as they are reciprocated.

7. In a can-making machine, the combination of a pair of anvils, laterally-adjustable supports therefor, a pair of vertically-reciprocating slides on said supports, a shaft, eccentrics on said shaft and adjustable with said supports, die-levers fulcrumed on said slides, and stationary abutments on said supports in the path of a part of said die-levers when the slides are reciprocated.

8. In a can-making machine, the combination of a pair of anvils, a pair of vertically-reciprocating slides one in proximity to each anvil, an oscillatory bell-crank die-lever fulcrumed on each slide, and abutments in the path of one arm of each of said bell-crank levers when the slides are reciprocated.

9. In a can-making machine, the combination of a pair of anvils, a pair of oppositely-disposed reciprocatory and oscillatory bell-crank die-levers, means simultaneously reciprocating said die-levers in opposite directions, and means engaging one arm of each of said levers at the terminal part of their reciprocatory movement to oscillate the other arms toward each other.

10. In a can-making machine, the combination of a pair of anvils, a pair of slides reciprocating in proximity thereto, a pair of oppositely-disposed two-armed die-levers fulcrumed to oscillate on said slides, means yieldingly engaging said levers to normally restrain them from oscillation, and abutments engaged by said levers during the terminal part of the reciprocation of said slides, whereby the levers are reciprocated and oscillated past the anvils.

11. In a can-making machine, a fixed anvil and a vertically-adjustable horn rigidly supported above but in close proximity to said anvil.

12. In a can-making machine, a fixed anvil, a slide vertically adjustable into fixed position above said anvil, and a horn supported on said slide.

13. In a can-making machine, a fixed anvil, a spring-pressed block mounted therein, and a vertically-adjustable horn rigidly supported above but in close proximity to said anvil.

14. In a can-making machine, a fixed anvil, a horn rigidly supported above but in close proximity to said anvil, and a spring-pressed part on said anvil receiving and yieldingly clamping the blank between said part and the horn.

15. In a can-making machine, a machine-frame, a fixed anvil thereon, a normally fixed but vertically-adjustable slide on said frame, a horn supported by said slide above said anvil, and a vertically-reciprocating plunger carried by the frame above the horn.

16. In a can-making machine, a horn, a soldering-iron yieldingly mounted above said horn, but not in contact therewith, automatic solder-feeding mechanism delivering solder at the front end of the iron, means feeding can-bodies along the horn and in contact with the iron, and means for heating the iron.

17. In a can-making machine, a horn, a soldering-iron yieldingly mounted above and extending longitudinally of said horn, said iron having a longitudinal groove formed along its lower edge, which groove is extended upward at its forward end.

18. In a can-making machine, a horn, a rocking bar extending transversely to the horn, a counterbalancing-weight on one end of said bar and a soldering-iron supported by the other end of the bar above the horn, and means adjusting the elevation of said iron above the horn.

19. In a can-making machine, a horn, a rocking surface supporting one end of the horn, and means for rocking said surface to permit the ejection of the can-bodies from the horn.

20. In a can-making machine, a horn, a curved surface extending transverse to and supporting one end of said horn, and means rocking said surface to permit the ejection of the can-bodies from the horn.

21. In a can-making machine, a curved surface extending transverse to and supporting one end of said horn, and an oscillating segmental gear imparting a rocking movement to said surface, whereby the can-body is ejected from said horn without interference from said curved surface.

22. In a can-making machine, a horn; feeding devices; means for upsetting the edges of the blanks; folding and seam-forming mechanism; ejecting devices; means simultaneously operating all of said parts, and means throwing all of said parts out of operation except the ejecting devices.

23. In a can-making machine, a horn, a main drive-shaft, means for upsetting the edges of the blanks and for folding the blanks around the horn, soldering devices and ejecting mechanism, means simultaneously operating all of said parts from said main shaft, and means throwing said upsetting and folding means out of action without stopping the soldering devices and ejecting mechanism.

24. In a can-making machine, a horn, a main shaft, means for upsetting the edges of the blanks and for folding the blanks around the horn, soldering devices and ejecting mechanism, clutch mechanism operatively connecting said parts to the main shaft, and means operatively connecting said soldering devices and ejecting mechanism to the main shaft only when said clutch mechanism is open.

25. In a can-making machine, a fixed anvil, a spring-pressed block mounted therein and having one end beveled, and a horn supported above said anvil.

26. In a can-making machine, a horn, a main shaft, means upsetting the edges of the blanks and for folding the blanks around the horn, soldering devices and ejecting mechanism, clutch mechanism operatively connecting all said parts to the main shaft, separate clutch mechanism connecting only the soldering devices, and ejecting mechanism to said main shaft, and a single means for operating both clutch mechanisms.

27. In a can-making machine, a horn, a soldering-iron yieldingly mounted above said horn and having a longitudinal groove in its under face, automatic solder-feeding mechanism delivering solder to said groove at the front end of the iron, means feeding can-bodies along the horn and in contact with the iron, and means for heating the iron.

28. In a can-making machine, a horn, a soldering-iron yieldingly mounted above said horn and provided with a longitudinal groove extended to the front of said iron and turned upward at its forward end, automatic solder-feeding mechanism delivering solder to the upturned end of said groove, means feeding can-bodies along the horn and in contact with the iron, and means for heating the iron.

In testimony whereof I have signed this specification in the presence of two subscribing witnesses.

WILLIAM H. H. STEVENSON.

Witnesses:
S. T. CAMERON,
WM. B. MERKAM.